No. 736,144. PATENTED AUG. 11, 1903.
H. PATTON.
ARTIFICIAL HAND.
APPLICATION FILED MAR. 18, 1903.
NO MODEL.

WITNESSES.
A. R. Appleman
Isaac B. Owens.

INVENTOR
Henry Patton
BY
ATTORNEYS.

No. 736,144.

Patented August 11, 1903.

UNITED STATES PATENT OFFICE.

HENRY PATTON, OF CRIPPLECREEK, COLORADO.

ARTIFICIAL HAND.

SPECIFICATION forming part of Letters Patent No. 736,144, dated August 11, 1903.

Application filed March 18, 1903. Serial No. 148,378. (No model.)

*To all whom it may concern:*

Be it known that I, HENRY PATTON, a citizen of the United States, and a resident of Cripplecreek, in the county of Teller and State of Colorado, have invented a new and Improved Artificial Hand, of which the following is a full, clear, and exact description.

This invention relates to a device intended to be fastened to the stump of an amputated arm by which tools of various sorts may be grasped, thus enabling the wearer to do manual labor. The device comprises a peculiarly-constructed gripper and also a novel device for enabling the jaws to be opened with one hand.

This specification is an exact description of one example of my invention, while the claims define the actual scope thereof.

Reference is to be had to the accompanying drawings, forming a part of this specification, in which similar characters of reference indicate corresponding parts in all the views.

Figure 1:
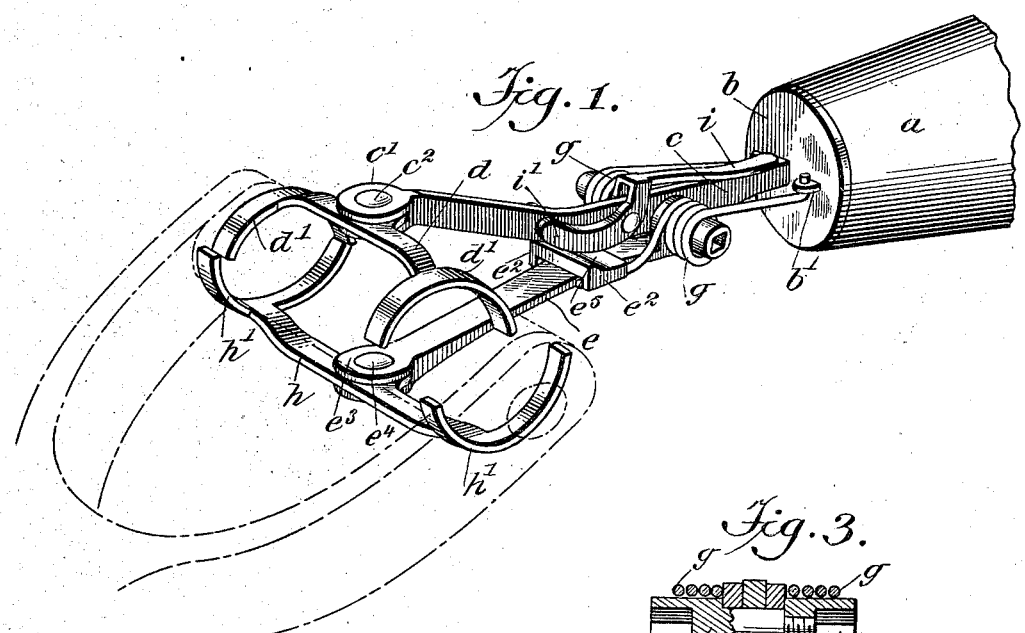
Figure 2:
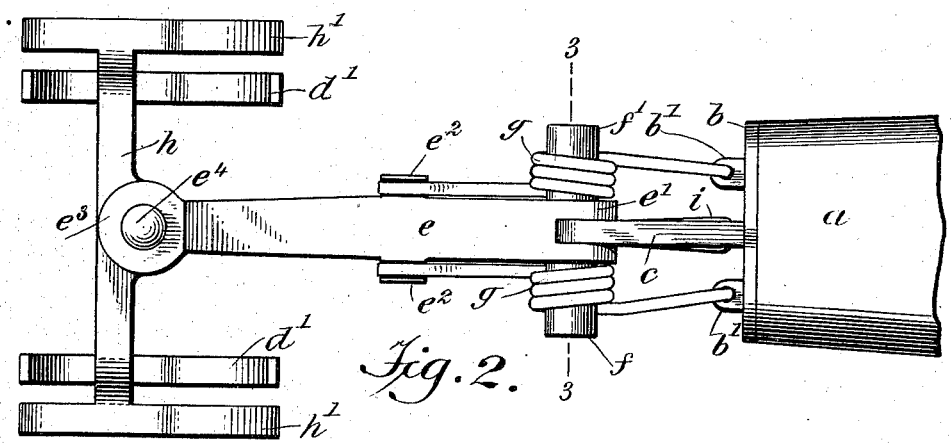

Figure 1 is a perspective view of the invention. Fig. 2 is an inverted plan view thereof, and Fig. 3 is a detail section on the line 3 3 of Fig. 2.

$a$ indicates a suitable stock which is adapted to be fastened to the stump of the arm in the usual manner. To the end of this stock is secured a metallic plate $b$, from which projects a rigid metal arm $c$, having its end $c'$ flattened and bifurcated, so that the gripper-jaw $d$ may be pivotally mounted thereon, as indicated at $c^2$. The gripper-jaw $d$ comprises a longitudinal main bar and curved or arc-shaped end pieces $d'$, extending transversely of the main bar.

Figure 3:
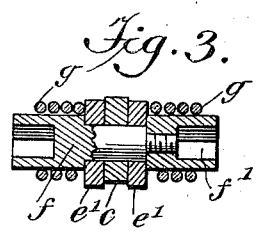

$e$ indicates the swinging arm of the device, the end $e'$ of which is bifurcated to straddle the arm $c$, as shown best in Fig. 3, and these parts are connected together, so that the arm $e$ may swing on the arm $c$ by means of a pivot formed in two sections $f$ and $f'$, said sections being screwed together, as shown in Fig. 3, and being orificed to permit the insertion of tools by which the pivot-sections may be manipulated. Springs $g$ are coiled around the respective pivot-sections $f$ and $f'$, and each spring has one end attached to the plate $b$ by means of lugs $b'$ and its other end projected outward and engaged with lugs $e^2$, which project laterally from the arm $e$. (See Fig. 2.)

The outer or free end of the arm $e$ is flattened and bifurcated, as indicated at $e^3$, and by means of a pin $e^4$ a second gripper-jaw $h$ is pivotally mounted between this bifurcated end of the arm $e$. Said gripper-jaw $h$ is provided with arc-shaped transversely-disposed end portions $h'$, the same essentially as the jaw $d$; but the jaw $h$ is preferably larger than the jaw $d$.

As shown by the dotted lines in Fig. 1, these jaws $d$ and $h$ are especially adapted to grasp the handle of a spade or shovel. They may, however, be engaged with numerous other articles, as will be apparent, and particularly with tools used in agricultural and kindred pursuits.

For enabling the arm $e$ to be conveniently moved away from the arm $c$, so as to open the artificial hand, I provide a lever, comprising an arm $i$, normally lying over the inner portion of the arm $c$, and a bifurcated arm $i'$, which straddles said arm $c$ and is in the form of a cam to engage a shouldered surface $e^5$, formed on or secured to the inner side of the arm $e$. When the jaws are in active position, the lever lies as in Fig. 1, and to spread the jaws it is only necessary to move outward the arm $i$ of the lever, thus causing the bifurcated cam-like arm $i'$ to lie against the lever and throw the same outward. Owing to the shoulder $e^5$ when the lever $e$ is thrown transversely to the arm $c$, so as to open the jaws, the parts will remain in open position until the lever is thrown back, whereupon the springs $g$ will return the parts to active position.

The manner of using the invention will be apparent, and in connection with its use it will be seen that by pivotally mounting the jaws $d$ and $h$ great freedom of movement is allowed the user notwithstanding that the tool or instrument gripped is held very securely, owing to the form of the jaws $d$ and $h$ and to the pressure of the springs $g$. The jaws may be quickly opened by means of the lever $i\,i'$ and allowed to close by merely knocking back this lever.

My invention may be applied to any artificial arm by properly shaping the stock $a$ to accommodate said arm.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. An artificial hand, comprising two members mounted to move toward and from each other, a gripper on each member, and means for holding the members in active position, said grippers comprising main or middle portions and arc-shaped end portions disposed transversely to the main portions.

2. The combination of an arm, a gripper thereon, a second arm mounted to swing on the first arm, a gripper on the second arm, and means for holding the arms in active position, said grippers comprising main portions and arc-shaped end portions disposed transversely thereto.

3. In an artificial hand, the combination of two arms mounted to swing the one on the other and having grippers thereon, a spring pressing the arms toward each other, and a lever fulcrumed on one arm and having a cam-shaped end to engage the other arm, for the purpose specified.

4. The combination of two arms arranged to swing toward and from each other, one arm having a shouldered portion thereon and each arm having a gripper, a spring pressing the arms toward each other, and a lever fulcrumed on the second arm and having a cam-shaped end coacting with the shouldered portion of the first-named arm.

5. In an artificial hand, the combination of two arms, a sectional pivot-pin connecting the two arms together, a spring coiled around said pin and acting between the arms, for the purpose specified, and grippers carried by the arms.

6. In an artificial hand, the combination of two arms, a sectional pin connecting the two arms together, a spring coiled around said pin and acting between the arms, for the purpose specified, grippers carried by the arms, and a lever fulcrumed on one arm and coacting with the other arm to facilitate spreading them.

7. An artificial hand comprising two arms, having grippers thereon and arranged to swing toward and from each other, a spring pressing said arms together, and a lever fulcrumed on one arm and arranged to engage one end with the other arm, for the purpose specified.

8. An artificial hand comprising two members, mounted to move toward and from each other, and two essentially parallel grippers pivoted thereon on axes transverse to the said members and arranged to swing thereon without disturbing their parallelism.

9. An artificial hand comprising two members, mounted to move toward and from each other, and two essentially parallel grippers pivoted thereon on axes transverse to the said members and arranged to swing thereon without disturbing their parallelism, said grippers comprising main portions bearing the pivots and arc-shaped end portions disposed transversely thereto.

In testimony whereof I have signed my name to this specification in the presence of two subscribing witnesses.

HENRY PATTON.

Witnesses:
J. M. WRIGHT,
H. L. SHEPHERD.